US009125116B2

(12) United States Patent
Huang et al.

(10) Patent No.: US 9,125,116 B2
(45) Date of Patent: *Sep. 1, 2015

(54) METHOD, APPARATUS AND SYSTEM FOR KEY DERIVATION

(71) Applicant: Huawei Technologies Co., Ltd., Shenzhen (CN)

(72) Inventors: Min Huang, Shenzhen (CN); Jing Chen, Shenzhen (CN); Aiqin Zhang, Shenzhen (CN); Xiaohan Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 53 days.

This patent is subject to a terminal disclaimer.

(21) Appl. No.: 13/667,944

(22) Filed: Nov. 2, 2012

(65) Prior Publication Data
US 2013/0079014 A1   Mar. 28, 2013

Related U.S. Application Data

(63) Continuation of application No. 13/197,154, filed on Aug. 3, 2011, now Pat. No. 8,320,568, which is a continuation of application No. 13/073,420, filed on Mar. 28, 2011, now Pat. No. 8,019,083, which is a
(Continued)

(30) Foreign Application Priority Data

Jun. 23, 2008 (CN) .......................... 2008 1 0067995

(51) Int. Cl.
*H04W 36/08* (2009.01)
*H04W 12/04* (2009.01)
*H04W 36/00* (2009.01)

(52) U.S. Cl.
CPC .............. *H04W 36/08* (2013.01); *H04W 12/04* (2013.01); *H04W 36/0038* (2013.01)

(58) Field of Classification Search
CPC .. H04W 36/08; H04W 12/04; H04W 36/0038
USPC .................................... 380/272, 274, 278, 44
See application file for complete search history.

(56) References Cited

U.S. PATENT DOCUMENTS 7,075,930 B1 * 7/2006 Chen et al. .................... 370/392
7,100,196 B2 * 8/2006 Fredriksson ...................... 726/3
(Continued)

FOREIGN PATENT DOCUMENTS

| CN | 1183718 C | 1/2005 |
|---|---|---|
| CN | 1937837 A | 3/2007 |

(Continued)

OTHER PUBLICATIONS

International Search Report of International Application No. PCT/CN2009/072322; Applicant: Huawei Technologies Co., Ltd., et al., mailing date: Sep. 17, 2009, 7 pages. (with partial translation).
(Continued)

*Primary Examiner* — David García Cervetti
(74) *Attorney, Agent, or Firm* — Slater & Matsil, L.L.P.

(57) ABSTRACT

A method, an apparatus and a system for key derivation are disclosed. The method includes the following steps: a target base station) receives multiple keys derived by a source base station, where the keys correspond to cells under control of the target base station; the target base station selects a key corresponding to the target cell after knowing a target cell that a user equipment (UE) wants to access. An apparatus for key derivation and a communications system are also provided.

20 Claims, 5 Drawing Sheets

Related U.S. Application Data continuation of application No. 12/942,494, filed on Nov. 9, 2010, now Pat. No. 7,936,880, which is a continuation of application No. PCT/CN2009/072322, filed on Jun. 17, 2009.

(56) References Cited

U.S. PATENT DOCUMENTS

| | | | |
|---|---|---|---|
| 7,602,918 B2* | 10/2009 | Mizikovsky et al. | 380/270 |
| 7,738,922 B2* | 6/2010 | Hashimoto et al. | 455/560 |
| 7,936,880 B2* | 5/2011 | Huang et al. | 380/272 |
| 8,019,083 B2* | 9/2011 | Huang et al. | 380/272 |
| 8,068,501 B2* | 11/2011 | Janakiraman et al. | 370/395.6 |
| 8,208,928 B2* | 6/2012 | Hapsari et al. | 455/438 |
| 2002/0154781 A1* | 10/2002 | Sowa et al. | 380/278 |
| 2004/0171399 A1* | 9/2004 | Uchida et al. | 455/514 |
| 2004/0198386 A1* | 10/2004 | Dupray | 455/456.1 |
| 2005/0013277 A1* | 1/2005 | Marque-Pucheu | 370/336 |
| 2005/0025116 A1* | 2/2005 | Chen et al. | 370/349 |
| 2005/0070283 A1* | 3/2005 | Hashimoto et al. | 455/435.1 |
| 2005/0143098 A1* | 6/2005 | Maillard | 455/456.5 |
| 2005/0159885 A1* | 7/2005 | Nomura | 701/208 |
| 2005/0249142 A1* | 11/2005 | Kim et al. | 370/312 |
| 2006/0078124 A1* | 4/2006 | Whelan et al. | 380/273 |
| 2007/0003062 A1* | 1/2007 | Mizikovsky et al. | 380/270 |
| 2007/0066298 A1* | 3/2007 | Hurst | 455/423 |
| 2007/0171871 A1* | 7/2007 | Forsberg | 370/331 |
| 2007/0224993 A1* | 9/2007 | Forsberg | 455/436 |
| 2007/0238464 A1* | 10/2007 | Lim et al. | 455/436 |
| 2007/0249352 A1* | 10/2007 | Song et al. | 455/436 |
| 2008/0013737 A1* | 1/2008 | Sowa et al. | 380/278 |
| 2008/0045141 A1* | 2/2008 | Suga | 455/7 |
| 2008/0045148 A1* | 2/2008 | Okuda | 455/18 |
| 2008/0045270 A1* | 2/2008 | Suga | 455/561 |
| 2008/0076430 A1* | 3/2008 | Olson | 455/440 |
| 2008/0159542 A1* | 7/2008 | Ito et al. | 380/279 |
| 2008/0167003 A1* | 7/2008 | Wang et al. | 455/411 |
| 2008/0188200 A1* | 8/2008 | Forsberg | 455/410 |
| 2008/0188221 A1* | 8/2008 | Hashimoto et al. | 455/435.1 |
| 2008/0207227 A1* | 8/2008 | Ren et al. | 455/458 |
| 2008/0240060 A1* | 10/2008 | Janakiraman et al. | 370/338 |
| 2008/0267407 A1* | 10/2008 | Vanderveen | 380/277 |
| 2008/0268844 A1* | 10/2008 | Ma et al. | 455/436 |
| 2009/0006846 A1* | 1/2009 | Rosenblatt | 713/159 |
| 2009/0011795 A1* | 1/2009 | Fukui et al. | 455/561 |
| 2009/0061878 A1* | 3/2009 | Fischer | 455/436 |
| 2009/0122763 A1* | 5/2009 | Oguchi | 370/331 |
| 2009/0168722 A1* | 7/2009 | Saifullah et al. | 370/331 |
| 2009/0227261 A1* | 9/2009 | Tiirola et al. | 455/450 |
| 2009/0252113 A1* | 10/2009 | Take | 370/331 |
| 2010/0002883 A1* | 1/2010 | Sammour et al. | 380/272 |
| 2010/0062783 A1* | 3/2010 | Luo et al. | 455/450 |
| 2010/0069119 A1* | 3/2010 | Mueck et al. | 455/561 |
| 2010/0144344 A1* | 6/2010 | Jiang | 455/433 |
| 2010/0178897 A1* | 7/2010 | Lee et al. | 455/411 |
| 2010/0202618 A1* | 8/2010 | Yang et al. | 380/277 |
| 2010/0205442 A1* | 8/2010 | Han et al. | 713/171 |
| 2010/0227603 A1* | 9/2010 | Gupta et al. | 455/418 |
| 2010/0234016 A1* | 9/2010 | Palanki et al. | 455/424 |
| 2010/0234027 A1* | 9/2010 | Han et al. | 455/436 |
| 2010/0267363 A1* | 10/2010 | Blom et al. | 455/410 |
| 2010/0278161 A1* | 11/2010 | Ore et al. | 370/338 |
| 2010/0279696 A1* | 11/2010 | Voyer et al. | 455/440 |
| 2010/0323662 A1* | 12/2010 | Dahlen et al. | 455/410 |
| 2011/0044455 A1 | 2/2011 | Huang et al. | |
| 2011/0116629 A1* | 5/2011 | Forsberg et al. | 380/44 |
| 2011/0165870 A1 | 7/2011 | Huang et al. | |
| 2011/0287773 A1 | 11/2011 | Huang et al. | |
| 2012/0129499 A1* | 5/2012 | Li | 455/411 |
| 2012/0157053 A1* | 6/2012 | Iwamura et al. | 455/411 |
| 2012/0213203 A1* | 8/2012 | Jung et al. | 370/331 |
| 2012/0244865 A1* | 9/2012 | Iwamura et al. | 455/437 |

FOREIGN PATENT DOCUMENTS

| | | |
|---|---|---|
| CN | 101043328 A | 9/2007 |
| CN | 101193427 A | 6/2008 |
| CN | 101616408 B | 4/2012 |
| EP | 2 271 144 A1 | 1/2011 |
| JP | 1012351 (A) | 1/1989 |
| KR | 10-2008-0018213 | 2/2008 |
| WO | WO 2007/005309 A1 | 1/2007 |
| WO | WO 2007/110748 A2 | 10/2007 |
| WO | WO 2008/042906 A2 | 4/2008 |
| WO | WO 2009/122260 A2 | 10/2009 |

OTHER PUBLICATIONS

Notice of Allowance and Fee(s) Due, U.S. Appl. No. 12/942,494, mailing date: Feb. 16, 2011, 13 pages.

Office Action Summary for Application Under Accelerated Examination, U.S. Appl. No. 13/073,420, mailing date: May 10, 2011, 10 pages.

Notice of Allowance and Fee(s) Due, U.S. Appl. No. 13/073,420, mailng date: Jul. 7, 2011, 12 pages.

Office Action Summary, U.S. Appl. No. 13/197,154, mailing date: Mar. 8, 2012, 13 pages.

Notice of Allowance and Fee(s) Due, U.S. Appl. No. 13/197,154, mailing date: Jul. 19, 2012, 15 pages.

"Oral Proceedings," CN Patent No. 200810185085.X, mailing date: Aug. 19, 2013, pp. 1-81.

"Extended European Search Report," Application No. 12157621.9-2412, Applicant: Huawei Technologies Co., Ltd., mailing date: Apr. 19, 2012, 9 pages.

"3rd Generation Partnership Project; Technical Specification Group Services and System Aspects; 3GPP System Architecture Evolution (SAE): Security architecture; (Release 8)," Technical Specification, Jun. 2008, 3GPP TS 33.401, V8.0.0, pp. 1-45.

"3rd Generation Partnership Project; Technical Specification Group Services and System Aspects; Rationale and track of security decisions in Long Term Evolved (LTE) RAN/3GPP System Architecture Evolution (SAE) (Release 8)," Technical Report, Apr. 2008, 3GPP TS 33.821, V0.8.0, pp. 1-125.

"Communication of a Notice of Opposition," Application No. 09768760.2-2412, Applicant: Huawei Technologies Co., Ltd., mailing date: Jul. 8, 2012, 1 page.

"Grounds of Opposition," Opposition by: ZTE Duetschland GmbH, Application No. EP 2 273 818 B1, mailing date: Jul. 26, 2012, 29 pages.

Nokia Siemens Networks, et al., "Radio Link Failure Recovery," 3GPP TSG-RAN WG2 Meeting #58, R2-072382, Agenda Item 4.5.1, Jun. 25-29, 2007, 8 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300, V8.2.0, Sep. 2007, pp. 1-109.

Ericsson, "KeNB Chaning with Prepared Handovers," 3GPP TSG SA WG3 Security—S3#50, S3-080058, Agenda Item, 6.9.5 Security mode establishment and mobility aspects, Feb. 25-29, 2008, pp. 1-9.

Ericsson, "KeNB Chaning with Prepared Handovers pCR to TS 33.abc," 3GPP TSG SA WG3 Security—S3#50, S3-080059, Agenda Item, 6.9.5 Security mode establishment and mobility aspects, Feb. 25-29, 2008, pp. 1-2.

SA3, "Reply to Response LS on Authentication at RRC Connection Re-establishment," 3GPP TSG SA WG3 Security—SA3#51, S3-080532, Apr. 14-18, 2008, pp. 1-3.

Qualcomm Europe, "Key Derivation for Prepared eNode Bs," 3GPP TSG SA WG3 Security—S3#50, S3-080177, Feb. 25-29, 2008, 1 page.

Huawei, "Security at RRC Connection Re-establishment," 3GPP TSG-RAN WG2 Meeting #62bis, R2-083556, Agenda item 6.2.1.3, Jun. 30-Jul. 4, 2008, pp. 1-4.

NTT Docomo, Inc., "Multiple KeNB and ShortMAC-I Forwarding at Handover," 3GGPP TSG RAN WG2 #63bis, Tdoc-R2-085549, Agenda Item 5.3.1, Sep. 29-Oct. 3, 2008, pp. 1-5.

(56) References Cited

OTHER PUBLICATIONS

Huawei, "Mutiple Cell Preparation at Handover," 3GPP TSG-RAN WG2 Meeting #63bis, R2-085535, Agenda item 5.3.1, Sep. 29-Oct. 3, 2008, pp. 1-3.

"Extended European Search Report," Application No. 09768760.2-2412, Applicant: Huawei Technologies Co., Ltd., May 3, 2011, 7 pages.

"3rd Generation Partnership Project; Technical Specification Group Services and System Aspects; 3GPP System Architecture Evolution: Security Architecture; (Release 8)," Technical Specification, Feb. 2008, 34 pages, 3GPP TS 33.abc V1.0.0.

"3rd Generation Partnership Project; Technical Specification Group Services and System Aspects; Rationale and track of security decisions in Long Term Evolved (LTE) RAN/3GPP System Architecture Evolution (SAE): (Release 8)," Technical Specification, Apr. 2008, 90 pages, 3GPP TR 33.821 V0.8.0.

"AS re-keying in case of inter-cell handover," Qualcomm Europe, 3GPP TSG-RAN WG2 meeting, R2-090065, Jan. 12-16, 2009, 44 pages.

"3rd Generation Partnership Project; Technical Specification Group Services and System Aspects; 3GPP System Architecture Evolution (SAE): Security Architecture; (Release 8)," Technical Specification, May 2008, 45 pages, 3 GPP TS 33.401 V2.0.0.

"3rd Generation Partnership Project; Technical Specification Group Radio Access Network; Evolved Universal Terrestrial Radio Access (E-UTRA); Radio Resource Control (RRC); Protocol specification (Release 8)," Technical Specification, Mar. 2008, 122 pages, 3 GPP TS 36.331 V8.1.0.

"3rd Generation Partnership Project; Technical Specification Group Radio Access Network; Evolved Universal Terrestrial Radio Access (E-UTRA); User Equipment (UE) procedures in idle mode (Release 8)," Technical Specification, Mar. 2008, 29 pages, 3 GPP TS 36.304 V8.1.0.

Korean Office Action, Application No. 10-2010-7025682, Applicant: Huawei Technologies Co., Ltd., Sep. 27, 2011, 7 pages.

PCT Written Opinion of the International Searching Authority for PCT/CN2009/072322, form PCT/ISA/237, mailed Sep. 17, 2009, Applicant: Huawei Technologies Co., Ltd., et al., 4 pages.

"3rd Generation Partnership Project; Technical Specification Group Radio Access Network; Evolved Universal Terrestrial Radio Access (E-UTRA) and Evolved Universal Terrestrial Radio Access Networks (E-UTRAN); Overall description; Stage 2 (Release 8)," 3GPP TS 36.300, V8.3.0, Dec. 2007, 121 pages.

"3rd Generation Partnership Project; Technical Specification Group Radio Access Network; Evolved Universal Terrestrial Radio Access (E-UTRA) Radio Resource Control (RRC); Protocol specification (Release 8)," 3GPP TS 36.331, V8.0.0, Dec. 2007, 56 pages.

"Draft Report of SA WG3 ad hoc meeting," 3GPP TSG SA WG3 (security)—S3#50, Feb. 25-29, 2008, 68 pages.

"Brief Communication," Application No. 09768760.2, Applicant: Huawei Techonologies Co., Ltd., Feb. 27, 2014, 15 pages.

"Summons to Attend Oral Proceedings Pursuant to Rule 115(1) EPC," Application No. 09768760.2, Applicant: Huawei Technologies Co., Ltd., Feb. 27, 2014, 4 pages.

\* cited by examiner

METHOD, APPARATUS AND SYSTEM FOR KEY DERIVATION

This application is a continuation of U.S. patent application Ser. No. 13/197,154 (now U.S. Pat. No. 8,320,568 B2), filed on Aug. 3, 2011, which is a continuation of U.S. patent application Ser. No. 13/073,420 now U.S. Pat. No. 8,019,083 B2), filed on Mar. 28, 2011, which is a continuation of U.S. patent application Ser. No. 12/942,494 (now U.S. Pat. No. 7,936,880 B2), filed on Nov. 9, 2010, which is a continuation of International Application No. PCT/CN2009/072322, filed on Jun. 17, 2009, which claims priority to Chinese Patent Application No. 200810067995.8, filed on Jun. 23, 2008, all of which are hereby incorporated by reference in their entireties.

TECHNICAL FIELD

The present invention relates to the mobile communication field, and in particular, to method, apparatus and system for key derivation.

BACKGROUND

In a long term evolution (LTE) system in the prior art, if a user equipment (UE) in connecting state detects that quality of signal in a source cell is poor, the base station of the source cell (hereinafter referred as source base station) makes the following handover preparations after receiving a measurement report from the UE. The source base station derives a key_A according to a target cell's physical cell identifier (ID), sends the key_A to the base station X of a target cell A (hereinafter referred as target base station), and sends a handover command to the UE. If the UE cannot receive the handover command in case of radio link failure (RLF), the UE re-selects a proper cell and initiates a radio resource control (RRC) connection reestablishment procedure to resume the service.

In the technical solution in the prior art, when the base station of a target cell B that the UE attempts to access through the connection reestablishment procedure is the same as the base station of the target cell A, the UE derives a key_B by using the physical cell ID of the target cell B, and encrypts messages that the UE sends to the base station X by using the key_B; the base station X decrypts the messages sent from the UE by using the key_A according to context information of the UE. Thus, the keys used by the UE and the base station X are inconsistent, which leads to a failure of communication between the UE and the base station.

SUMMARY

Embodiments of the present invention provide a method, an apparatus and a system for key derivation.

According to one aspect of the present invention, a communication system is provided. The communication system includes a base station functioning as a target base station for a User Equipment (UE), the target base station configured to receive multiple keys corresponding to multiple cells under control of the target base station, and to select a key from the multiple keys for being used in communication with the UE, wherein the selected key corresponding to a target cell that the UE requests to access.

According to the other aspect of the present invention, an apparatus for a communication system is provided. The apparatus includes at least one processor configured to send an RRC connection reestablishment request to a target base station, to receive a RRC connection reestablishment message from the target base station, and to derive a key in accordance with a physical cell identifier (ID) of a target cell for being used in communication with the target base station, and a memory coupled to the at least one processor.

According to another aspect of the present invention, a machine-readable medium is provided, which includes: a instructions which, when executed by a machine, cause the machine to perform operations including: receiving multiple keys corresponding to multiple cells under control of a target base station for a User Equipment (UE) from a source base station for the UE; and selecting a key from the multiple keys for being used in communication with the UE, wherein the selected key corresponding to a target cell that the UE requests to access.

A communications system provided in an embodiment of the present invention includes the key deriving apparatus provided in an embodiment of the present invention and the UE that communicates with the key deriving apparatus.

In exemplary embodiments of the present invention, the UE and the network apparatus derive keys by using the same key derivation parameters. Thus, the UE and the network apparatus derive the same key, which guarantees normal communication between the UE and the network apparatus, reduces the call drop rate, and brings a better user experience.

DETAILED DESCRIPTION OF ILLUSTRATIVE EMBODIMENTS

The technical solution of the present invention is hereinafter described in detail with reference to the accompanying drawings. It is evident that the embodiments are exemplary only and the present invention is not limited to such embodiments. Other embodiments that those skilled in the art obtain based on embodiments of the present invention also fall in the scope of protection of the present invention.

In the method for key derivation in an exemplary embodiment of the present invention, when the target base station receives at least one key that is derived according to the target base station identifier (ID) and/or target cell's physical cell ID (PCI), upon reception of an RRC connection reestablishment request from a UE, the target base station selects a Key_A and provides the UE with the target base station ID or target cell's physical cell ID used for deriving the Key_A. The selected Key_A may be derived according to the target base station ID, or according to the target cell's physical cell ID corresponding to the cell where the UE is located or according to the physical cell ID carried in the RRC connection reestablishment request. Thus, the key derived by the UE is the consistent with the key determined by the target base station, which guarantees normal communication between the UE and the base station, reduces the call drop rate, and brings a better user experience.

In exemplary embodiments of the method for key derivation, the UE initiates a connection reestablishment procedure, and derives a key according to the target base station ID or target cell's physical cell ID provided by the target base station. Thus, the key derived by the UE is consistent with the key used by the target base station, which guarantees normal communication between the UE and the base station, reduces the call drop rate, and brings a better user experience.

In the prior art, the process of key derivation includes a primary derivation process in which a key KeNB* is derived according to the target cell's physical cell ID and a secondary process in which a key KeNB** is derived according to the KeNB* derived in the primary derivation process. The process of key derivation carried out by the UE and the network apparatus in embodiments of the present invention is the primary derivation process. In the method for key derivation in an embodiment of the present invention, the UE and the network apparatus derive the same KeNB* in the primary derivation process. Thus, the UE and the network apparatus also derive the same KeNB in the secondary derivation process, so that the UE and the network apparatus can maintain normal communications by using the KeNB. It is understandable to those skilled in the art that the method for key derivation described in exemplary embodiments of the present invention can be combined with the method involved in the secondary derivation process in the prior art, a detailed description is omitted here.

Figure 1:
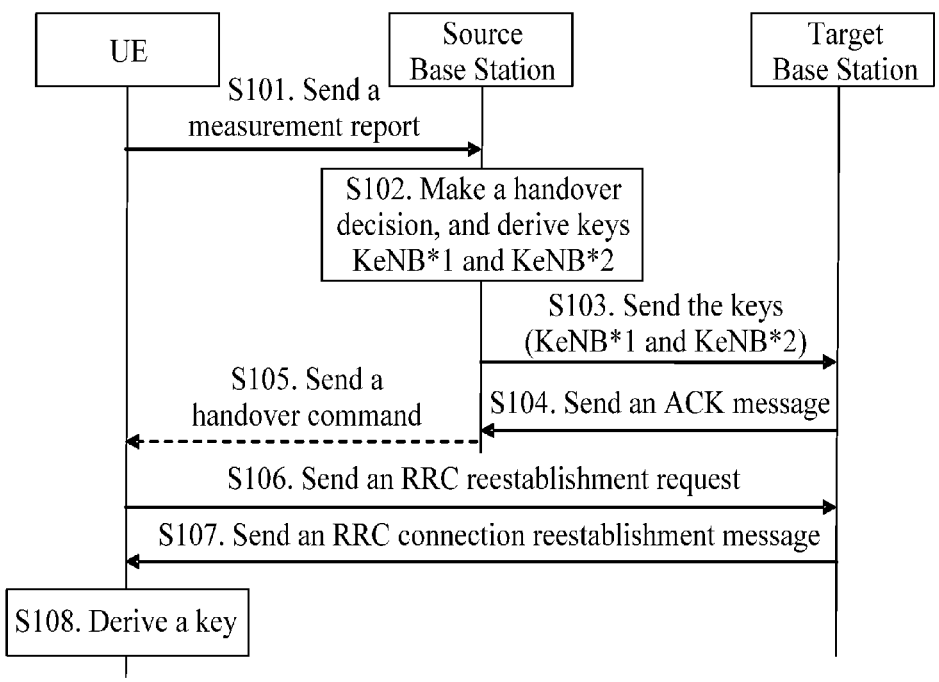
FIG. 1 is a flowchart of a method for key derivation according to a first exemplary embodiment of the present invention.

FIG. 1 is a flowchart of a method for key derivation according to the first exemplary embodiment. As shown in FIG. 1, a source base station is a network apparatus (for example, eNode B) that currently serves a UE, and the target base station is another network apparatus that the source base station selects to serve the UE. The method includes the following steps:

S101. The UE sends a measurement report to the source base station.

S102. The source base station makes a handover decision and derives keys according to the obtained target cell's physical cell ID and the target base station ID respectively.

In this step, it is assumed that the key derived according to the target cell's physical cell ID is KeNB*1 and the key derived according to the target base station ID is KeNB*2.

It is understandable to those skilled in the art that various key derivation algorithms and methods in the prior art are applicable to the key derivation process in this step and are not further described.

S103. The source base station sends the KeNB*1 and KeNB*2 to the target base station.

In this step, the keys may be carried in an access stratum message sent through an X2 interface between the source base station and the target base station. For example, the keys are carried in reserved fields or extended fields in an existing message (for example, a handover request) or a new message. The keys may also be carried in a message sent by an S1 interface between the source base station and a mobility management entity (MME), and the MME provides the received keys for the target base station.

S104. The target base station stores the received key, and sends a handover request Acknowledgement (ACK) message.

S105. The source base station sends a handover command to the UE.

If the UE receives the handover command, the UE executes S106' (not shown in the Figure). That is, the UE derives a key KeNB*1' according to the target cell's physical cell ID. The KeNB*1' is consistent with the KeNB*1 stored in the target base station in terms of derivation algorithms and parameters, and thus the KeNB*1' is consistent with the KeNB*1.

If an Radio Link Failure (RLF) or handover failure occurs, the connection reestablishment procedure initiated by the UE may include the following steps:

S106. The UE sends an RRC connection reestablishment request to the target base station.

S107. If the target base station receives the connection reestablishment request and finds that the key corresponding to the UE is stored in the target base station, the target base station selects the KeNB*2, and sends an RRC connection reestablishment message to the UE.

In this step, the target base station may search for the context information in the target base station according to the UE information so as to find whether the key corresponding to the UE is stored in the target base station. The process of selecting the KeNB*2 by the target base station is a secondary derivation process performed by the target base station according to the KeNB*2. If, after searching for the context information, the target base station finds that the key corresponding to the UE is not stored in the target base station, the target base station may establish a communication with the UE to obtain the context information of the UE and select some of the context information for storing, which does not affect the implementation of the present invention.

S108. The UE receives the RRC connection reestablishment message, and derives a key KeNB*2' according to the obtained target base station ID.

The KeNB*2' in this step is consistent with the KeNB*2 stored in the target base station in terms of derivation algorithms and parameters, and thus the KeNB*2' is consistent with the KeNB*2. The KeNB*2' derived by the UE is used in the secondary derivation process.

In this step, the target base station ID obtained by the UE may come from a system broadcast message. That is, before starting the connection reestablishment procedure or after receiving the RRC connection reestablishment message, the UE reads the target base station ID carried in the system broadcast message. The target base station ID obtained by the UE may also come from the RRC connection reestablishment message. That is, the RRC connection reestablishment message that the target base station sends to the UE in S107 carries a target base station ID, and the UE reads the target base station ID and derives a key in S108, making it unnecessary to read the system broadcast message. In addition, the target base station ID obtained by the UE may come from other messages that the target base station sends to the UE.

It is understandable to those skilled in the art that a cell global identifier (CGI) includes information about the target base station ID. Thus, the message that carries the target base station ID may also be the message that carries the CGI. The receiver reads information about the target base station ID from the CGI, and then uses the target base station ID.

In this embodiment, the source base station sends the two derived keys to the target base station. If the UE succeeds in handover, the UE communicates with the target base station by using the key derived according to the target cell's physical cell ID. When the connection reestablishment procedure is performed in case of an RLF or handover failure of the UE, the UE communicates with the target base station by using the key derived according to the target base station ID. Thus, normal communication between the UE and the network apparatus is guaranteed. The method provided in this embodiment can reduce the call drop rate and bring a better user experience without changing the air interface.

The second exemplary embodiment is similar to the first embodiment except for the following difference: The source base station drives a key according to the obtained target base station ID instead of the target cell's physical cell ID, and sends the derived KeNB*2 to the target base station; the target base station carries a target base station ID in the handover command sent to the UE, so that the UE can derive the KeNB*2' according to the target base station ID after receiving the handover command. Thus, the KeNB*2' is consistent with the KeNB*2. In addition, if the UE initiates a connection reestablishment procedure due to failure to receive the handover command, the target base station carries the target base station ID in the RRC connection reestablishment message sent to the UE or carries the target base station ID in the system broadcast message, so that the UE derives the KeNB*2' according to the target base station ID read from the RRC connection reestablishment message or system broadcast message. Thus, the KeNB*2' is the consistent as the KeNB*2.

In this embodiment, the UE and the network apparatus derive keys by using the target base station ID as the parameter. Thus, the keys derived by the UE and the network apparatus are consistent, which guarantees normal communication between the UE and the network apparatus, reduces the call drop rate, and brings a better user experience.

Figure 2:
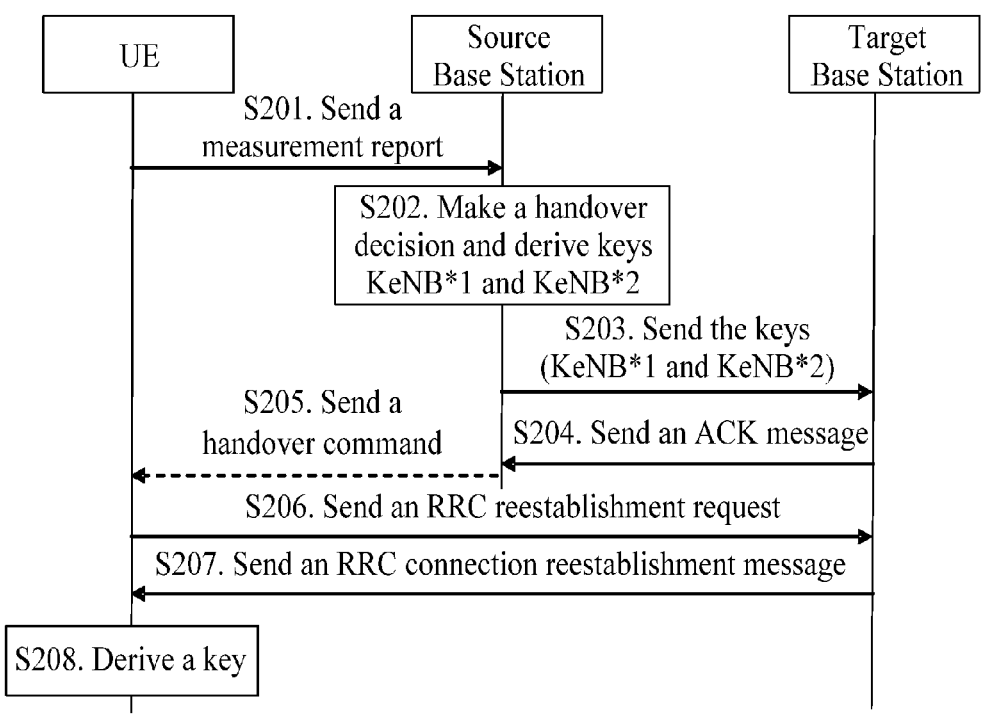
FIG. 2 is a flowchart of a method for key derivation according to a third exemplary embodiment of the present invention.

FIG. 2 is a flowchart of a method for key derivation in the third exemplary embodiment of the present invention. As shown in FIG. 2, the source base station is a network apparatus (for example, source eNodeB) that currently serves the UE, and the target base station is another network apparatus (for example, target eNode B) that the source base station selects to serve the UE. The method includes the following steps:

S201. The UE sends a measurement report to the source base station.

S202. The source base station makes a handover decision, searches for all target cells' physical cell IDs corresponding to the source base station according to the obtained target base station ID, and derives keys according to the target cells' physical cell IDs respectively.

In this step, it is assumed that the target base station has three cells; that is, there are three target cells' physical cell IDs corresponding to the target base station ID, namely, Cell1, Cell2, and Cell3. Thus, three keys are derived, represented by KeNB*1, KeNB*2, and KeNB*3.

It is understandable to those skilled in the art that various key derivation algorithms and methods in the prior art are applicable to the key derivation process in this step and are not further described.

S203. The source base station sends the KeNB*1, KeNB*2 and KeNB*3 to the target base station.

In this step, the keys may be carried in an access stratum message sent through the X2 interface between the source base station and the target base station. The keys may be carried in reserved fields or extended fields in an existing message (for example, a handover request) or a new message. The keys may also be carried in a message sent by the S1 interface between the source base station and the MME, and the MME provides the received keys for the target base station. In addition, the source base station may carry multiple keys in one message for transmission so as to save resources and improve the transmission efficiency. Furthermore, the source base station may also carry multiple keys to different messages for transmission so as to improve the flexibility of transmission.

S204. The target base station stores the received keys, and sends a handover request ACK message.

S205. The source base station sends a handover command to the UE.

If the UE receives the handover command and obtains a target cell's physical cell ID, for example Cell1, the UE executes S206' (not shown in the figure). That is, the UE derives a KeNB*1' according to the Cell1's physical cell ID. The KeNB*1' is consistent with the KeNB*1 in the target base station in terms of derivation algorithms and parameters, and thus the KeNB*1' is consistent with the KeNB*1.

If the UE cannot receive the handover command in case of an RLF, the connection reestablishment procedure initiated by the UE includes the following steps:

S206. The UE sends an RRC connection reestablishment request to the target base station.

S207. The target base station receives the connection reestablishment request, and learns that a physical cell ID of the cell which the UE requests to access is the ID of Cell2 of the target base station. The target base station uses the KeNB*2 corresponding to the Cell2, and sends an RRC connection reestablishment message to the UE.

S208. The UE receives the RRC connection reestablishment message, and derives a KeNB*2' according to the Cell2.

In this step, the KeNB*2' is consistent with the KeNB*2 stored in the target base station in terms of derivation algorithms and parameters, and thus the KeNB*2' is consistent with the KeNB*2.

In this step, the target cell's physical cell ID obtained by the UE may come from a physical layer ID broadcasted in the system or from the RRC connection reestablishment message. The target base station may carry a target cell's physical cell ID in the RRC connection reestablishment message sent to the UE in step S207, and the UE reads the target cell's physical cell ID and derives a key in S208. The target cell's physical cell ID obtained by the UE may also come from other messages that the target base station sends to the UE.

In this embodiment, the source base station sends all the keys derived according to the target cells' physical cell IDs to the target base station, so that the target base station may select a key for being used in communications with the UE according to a cell that the UE wants to access. Thus, the success rate of UE access to new cells is increased and may reach 100%. The source base station may also select some of key(s) and send the key(s) to the target base station according to some conditions; for example, it may only send key(s) derived according to the target cell(s)' physical cell ID(s) of cell(s) with a higher priority. The source base station may also derive key(s) according to some conditions; for example, it may only derive key(s) according to the target cell(s)' physical cell ID(s) of cell(s) with a lower priority and send the derived key(s) to the target base station. Thus, the success rate of UE access is increased and the amount of information transmitted by the source base station is reduced, but the success rate of UE access is smaller than 100%.

In the method provided in the preceding exemplary embodiment of the present invention, if an RLF occurs when the UE accesses a cell a1 of a target base station A, the UE can access a cell a2 of the target base station through the connection reestablishment procedure. It should be noted that the measurement report sent to the source base station by the UE carries information of multiple accessible target base stations. Thus, the key derivation process of the source base station may be specific to multiple cells under control of multiple target base stations. However, during the key transmission, the keys that the source base station sends to the target base station A may include only keys of different cells under control of the target base station A. Thus, the preceding embodiment exemplary of the present invention is also applicable to the process of UE handover between different target base stations.

Figure 3:
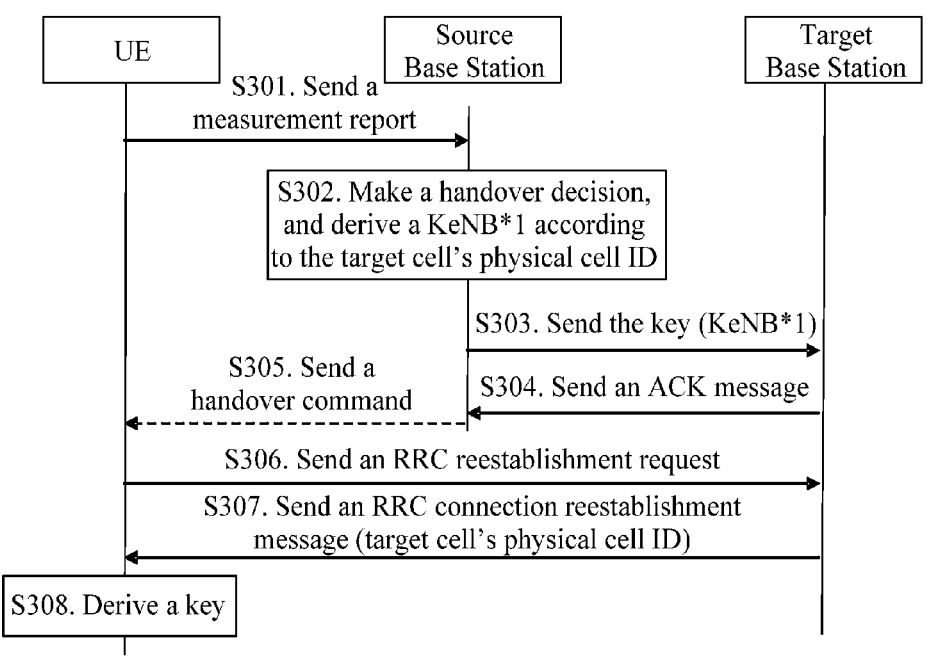
FIG. 3 is a flowchart of a method for key derivation according to a fourth exemplary embodiment of the present invention.

FIG. 3 is a flowchart of a method for key derivation according to the fourth exemplary embodiment of the present invention. As shown in FIG. 3, the source base station is a network apparatus (for example, source eNodeB) that currently serves the UE, and the target base station is another network apparatus (for example, target eNodeB) that the source base station selects to serve the UE. The method includes the following steps:

S301. The UE sends a measurement report to the source base station.

S302. The source base station makes a handover decision, and derives a key according to the obtained target cell's physical cell ID.

In this step, it is assumed that the key derived according to the target cell1's physical cell ID is KeNB*1. Various key derivation algorithms and methods in the prior art are applicable to the key derivation process in this step, and are not further described.

S303. The source base station sends the KeNB*1 to the target base station.

S304. The target base station stores the received key, and sends a handover request ACK message.

S305. The source base station sends a handover command to the UE.

If the UE cannot receive the handover command in case of an RLF, the connection reestablishment procedure initiated by the UE may include the following steps:

S306. The UE sends an RRC connection reestablishment request to the target base station.

S307. After the target base station receives the connection reestablishment request, the target base station sends an RRC connection reestablishment message that carries the Cell1 in the handover request, and derives a KeNB*1 by using the Cell1.

S308. The UE receives the RRC connection reestablishment message, and derives a KeNB*1' by using the Cell1. Thus, the KeNB*1' is consistent with the KeNB*1.

In this embodiment, the target base station may use the key already stored in the target base station without re-deriving a key. The UE derives a key according to the target cell's physical cell ID provided by the target base station. Thus, the keys used by the UE and the network apparatus are the same, which guarantees normal communication between the UE and the network apparatus, reduces the call drop rate, and brings a better user experience.

It is understandable to those skilled in the art that this embodiment is applicable not only to the process of UE handover between different cells under control of the same target base station, but also to the process of UE handover between different target base stations.

In addition, it is understandable to those skilled in the art that the network apparatus and the UE in this embodiment may reach an agreement in advance on one or more of the following aspects: method for key derivation, method for selecting key derivation parameters, and method for sending key derivation parameters. In this case, the network apparatus derives a key according to the agreed method, and sends the needed parameters to the UE, while the UE receives the needed parameters and derives a key according to the agreed method. The network apparatus and the UE may also determine the preceding methods through negotiations. The specific negotiation method does not affect the implementation of the present invention and technical solution, and therefore is not further described.

Figure 4:
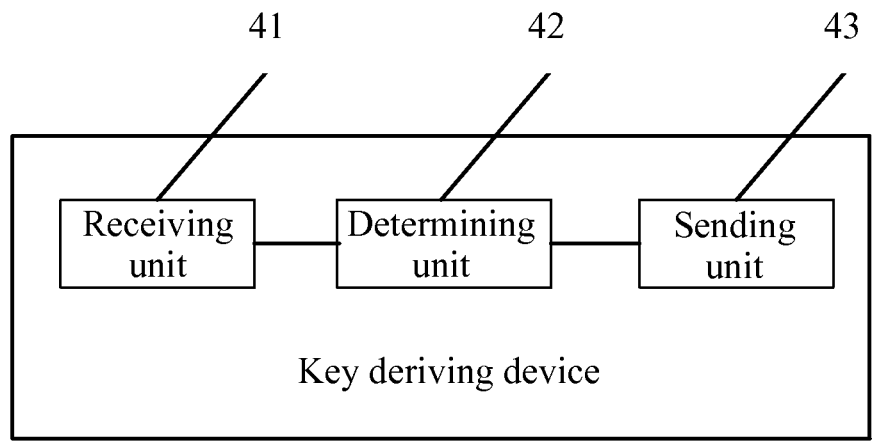
FIG. 4 is a schematic diagram illustrating an apparatus for key derivation according to a fifth exemplary embodiment of the present invention.

FIG. 4 illustrates an apparatus for key derivation according to the fifth embodiment of the present invention. The apparatus includes:

a receiving unit 41, configured to receive at least one key, where the key is derived according to a target base station ID and/or a target cell's physical cell ID;

a determining unit 42, configured to receive an RRC reestablishment request from a UE, and select a Key_A, where the Key_A may be derived according to the target base station ID, or according to the target cell's physical cell ID corresponding to the cell where the UE is located, or be derived according to a physical cell ID carried in the RRC reestablishment request; and a sending unit 43, configured to send the target base station ID or target cell's physical cell ID required for deriving the Key_A.

Figure 5:
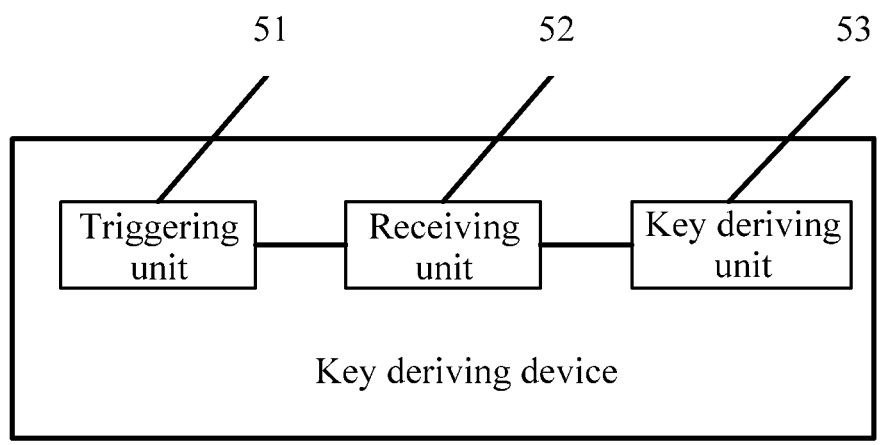
FIG. 5 is a schematic diagram illustrating an apparatus for key derivation in according to sixth exemplary embodiment of the present invention.

FIG. 5 illustrates an apparatus for key derivation according to the sixth exemplary embodiment of the present invention. The apparatus includes:

a triggering unit 51, configured to initiate a connection reestablishment procedure, and trigger a receiving unit 52;

the receiving unit 52, configured to receive the target base station ID and/or target cell's physical cell ID when being triggered by the triggering unit 51; and a key deriving unit 53, configured to derive a key according to the target base station ID or target cell's physical cell ID received by the receiving unit 52.

Figure 6:
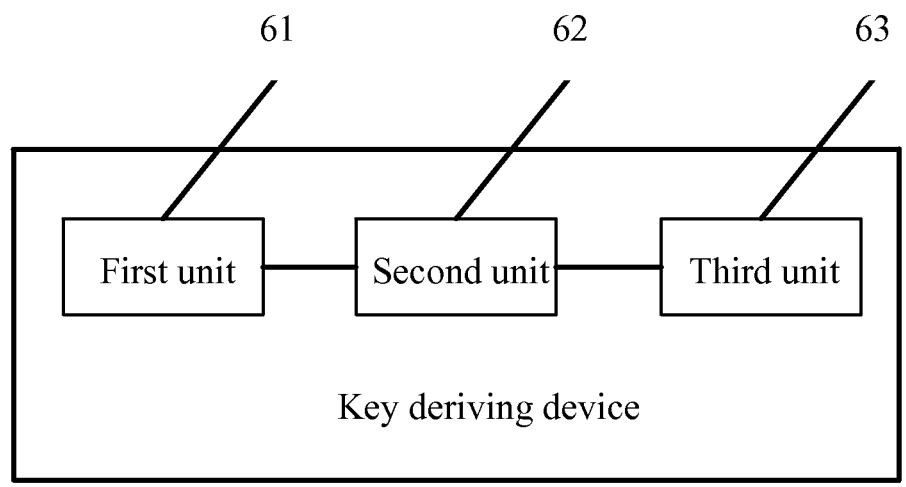
FIG. 6 is a schematic diagram illustrating an apparatus for key derivation according to a seventh exemplary embodiment of the present invention.

FIG. 6 illustrates an apparatus for key derivation according to the seventh exemplary embodiment of the present invention. The apparatus includes a first unit 61 and a second unit 62.

The first unit 61 is configured to receive multiple keys derived by a source base station, where the multiple keys correspond to cells under control of a target base station. The second unit 62 is configured to select a key corresponding to a target cell after knowing the target cell that the UE requests to access. Further, the key corresponding to the target cell that the second unit 62 selects is derived by the source base station according to the target cell's a physical cell ID.

The keys corresponding to the cells under control of the target base station that the first unit 61 receives are derived by the source base station according to cell's physical cell IDs of the target base station. The source base station may send all the keys that are derived according to the target cells' physical cell IDs to the target base station, so that the target base station may select a key for being used in communications with the UE according to the cell that the UE wants to access. Thus, the success rate of UE access to new cells is 100%. The source base station may also select a key and send the key to the target base station according to some conditions; for example, it may only send a key derived according to physical cell ID(s) of target cell(s) with a higher priority. The source base station may also derive a key according to some conditions; for example, it may only derive a key according to physical cell ID(s) of target cell(s) with a low priority, and send the key(s) to the target base station. Thus, the success rate of UE access is increased and the amount of information transmitted by the source base station is reduced, but the success rate of UE access is lower than 100%.

The first unit 61 is further configured to receive an RRC connection reestablishment request from the UE.

The apparatus for key derivation may further include a third unit 63, which is configured to send the target cell's physical cell ID to the UE.

Optionally, the apparatus for key derivation in this embodiment may be a base station.

Figure 7:
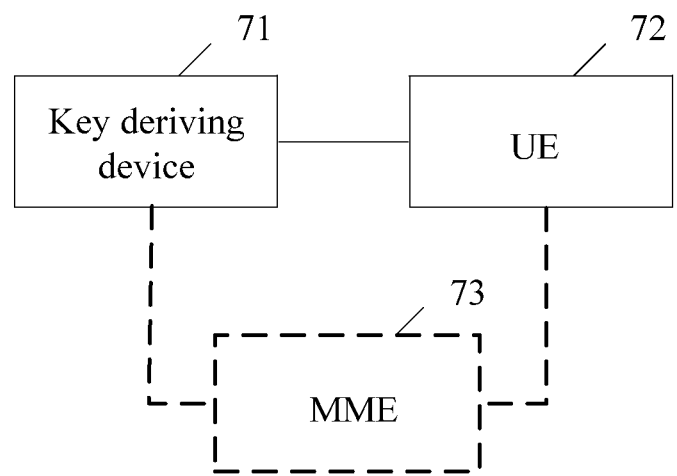
FIG. 7 is a schematic diagram illustrating a communications system according to an eighth exemplary embodiment of the present invention.

FIG. 7 illustrates a communications system according to the eighth exemplary embodiment of the present invention. The communications system includes apparatus 71 for key derivation according to the seventh exemplary embodiment and a UE 72 that communicates with the apparatus 71.

The communications system may further include an MME 73, which is configured to: receive a target cell physical ID that the apparatus 71 sends to the UE, and forward the target cell physical ID to the UE.

Further, the apparatus 71 in the communications system may be used as the target base station of the UE.

The ninth exemplary embodiment of the present invention also provides a communications system. The communications system includes a UE and a network apparatus.

The UE is configured to derive a key according to the received target base station ID or target cell's physical cell ID.

The network apparatus is configured to: select a Key_A from at least one key that is derived according to the target base station ID and/or target cell's physical cell ID according to the received RRC reestablishment request, and send the target base station ID and target cell's physical cell ID used for deriving the Key_A.

The communications system may further include a Mobility Management Entity (MME), which is configured to forward the information about communication between the network apparatus and the UE. The MME forwards the target base station ID or target cell's physical cell ID sent from the network apparatus to the UE.

It is understandable to those skilled in the art that all or part of the steps in the preceding embodiments may be implemented by hardware instructed by a program. The program may be stored in a computer readable storage medium. When the program is executed, the processes of the preceding method embodiments are involved. The preceding storage medium may be a magnetic disk, a compact disk (CD), a read-only memory (ROM), or a random access memory (RAM).

In embodiments of the present invention, the key deriving apparatus and communications system can ensure that the UE and the network apparatus use the same key, which guarantees the normal communication between the UE and the network apparatus, reduces the call drop rate, and brings a better user experience.

Although the invention has been described through several exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the claims or their equivalents.

What is claimed is:

1. A communication system, comprising:
a base station functioning as a target base station for a User Equipment (UE), the target base station configured to receive multiple keys corresponding to multiple cells under control of the target base station, and to select a key from the multiple keys for being used in communication with the UE, wherein the selected key corresponding to a target cell that the UE requests to access.

2. The communication system according to claim 1, further comprising a base station functioning as a source base station for the UE, wherein the source base station is configured to derive multiple keys in accordance with physical cell identifiers (IDs) of cells under control of the target base station.

3. The communication system according to claim 1, further comprising a base station functioning as a source base station for the UE, wherein the source base station is configured to send the multiple keys to the target base station.

4. The communication system according to claim 1, further comprising a base station functioning as a source base station for the UE, wherein the multiple keys are derived by the source base station according to the physical cell IDs of cells with higher priorities of the target base station.

5. The communication system according to claim 4, wherein the multiple keys are all or part of keys derived by the source base station according to the physical cell IDs of all cells under control of the target base station.

6. The communication system according to claim 1, further comprising a base station functioning as a source base station for the UE and a mobility management entity (MME), wherein the source base station is configured to send a message carrying the multiple keys to the MME, and the MME is configured to provide the received multiple keys for the target base station.

7. The communication system according to claim 1, the target base station is configured to receive a Radio Resource control (RRC) connection reestablishment request from the UE, and to know the target cell that the UE requests to access.

8. The communication system according to claim 1, further comprising the UE, the UE is configured to send a Radio Resource Control (RRC) connection reestablishment request message carrying information of the physical cell ID of the target cell to the target base station.

9. The communication system according to claim 1, wherein the UE is configured to derive a key in accordance with the physical cell ID of the target cell that the UE requests to access.

10. The communication system according to claim 1, wherein the target base station is configured to send a target cell's physical cell ID to the UE.

11. The communication system according to claim 1, wherein the target base station is configured to send system broadcast comprising the target cell's physical cell ID to the UE.

12. An apparatus for a communication system, comprising:
at least one processor configured to send an RRC connection reestablishment request to a target base station, to receive a RRC connection reestablishment message from the target base station, and to derive a key in accordance with a physical cell identifier (ID) of a target cell for being used in communication with the target base station, and
a memory coupled to the at least one processor.

13. The apparatus according to claim 12, wherein the derived key is consistent with a key selected by the target base station, wherein the key selected by the target base station is selected from multiple keys corresponding to multiple cells under control of the target base station.

14. The apparatus according to claim 12, wherein the RRC connection reestablishment request comprising information of the physical cell ID of the target cell which the UE requests to access.

15. The apparatus according to claim 12, wherein the at least processor is configured to send a measurement report to a source base station, the measurement report carrying information of multiple accessible target base stations.

16. The apparatus according to claim 12, wherein the at least processor is configured to receive a RRC connection reestablishment message from the target base station.

17. A non-transitory machine-readable medium comprising instructions which, when executed by a machine, cause the machine to perform operations including:
   receiving multiple keys corresponding to multiple cells under control of a target base station for a User Equipment (UE) from a source base station for the UE; and
   selecting a key from the multiple keys for being used in communication with the UE, wherein the selected key corresponding to a target cell that the UE requests to access.

18. The non-transitory machine-readable medium according to claim 17, wherein the instructions further cause the machine to perform operations including:
   deriving multiple keys in accordance with physical cell identifiers (IDs) of cells under control of the target base station.

19. The non-transitory machine-readable medium according to claim 17, wherein the multiple keys are all or part of keys derived by the source base station according to the physical cell IDs of all cells under control of the target base station.

20. The non-transitory machine-readable medium according to claim 17, wherein the instructions further cause the machine to perform operations including:
   receiving a Radio Resource control (RRC) connection reestablishment request from the UE; and
   sending a RRC connection reestablishment message to the UE.

* * * * *